(12) United States Patent
Liu et al.

(10) Patent No.: US 7,855,163 B2
(45) Date of Patent: Dec. 21, 2010

(54) LOW COEFFICIENT OF THERMAL EXPANSION BONDING SYSTEM FOR A HIGH POROSITY CERAMIC BODY AND METHODS OF MANUFACTURE

(75) Inventors: James Jenq Liu, Mason, OH (US); Bilal Zuberi, Cambridge, MA (US)

(73) Assignee: GEO2 Technologies, Inc., Woburn, MA (US)

( * ) Notice: Subject to any disclaimer, the term of this patent is extended or adjusted under 35 U.S.C. 154(b) by 0 days.

(21) Appl. No.: 12/015,103

(22) Filed: Jan. 16, 2008

(65) Prior Publication Data

US 2008/0283465 A1 Nov. 20, 2008

Related U.S. Application Data

(63) Continuation-in-part of application No. 11/748,306, filed on May 14, 2007, now Pat. No. 7,567,817, and a continuation-in-part of application No. 11/831,398, filed on Jul. 31, 2007.

(51) Int. Cl.
*B01J 21/04* (2006.01)

(52) U.S. Cl. .................................. 502/439; 502/309

(58) Field of Classification Search .............. 502/439, 502/309
See application file for complete search history.

(56) References Cited

U.S. PATENT DOCUMENTS

| | | | |
|---|---|---|---|
| 4,384,046 A | 5/1983 | Nakagami et al. | |
| 4,659,610 A | 4/1987 | George | |
| 4,737,192 A | 4/1988 | Smith | |
| 5,217,789 A | 6/1993 | Elliott et al. | |
| 5,322,537 A | 6/1994 | Nakamura et al. | |
| 5,928,775 A * | 7/1999 | DiChiara et al. | 428/312.2 |
| 5,981,415 A | 11/1999 | Waku e | |
| 7,074,480 B2 * | 7/2006 | Fukutani et al. | 428/312.2 |
| 7,141,204 B2 | 11/2006 | Horn et al. | |
| 7,250,212 B2 * | 7/2007 | Naito et al. | 428/372 |
| 7,276,276 B2 * | 10/2007 | Noguchi et al. | 428/116 |
| 7,396,586 B2 * | 7/2008 | Ohno et al. | 428/327 |
| 7,413,700 B2 | 8/2008 | Merrill et al. | |
| 7,427,309 B2 * | 9/2008 | Ohno et al. | 55/523 |
| 7,455,710 B2 * | 11/2008 | Masukawa et al. | 55/523 |
| 7,517,502 B2 * | 4/2009 | Ohno et al. | 422/177 |
| 7,521,389 B2 | 4/2009 | Shmotev et al. | |
| 2004/0156766 A1 | 8/2004 | Jaussaud et al. | |
| 2004/0197279 A1 | 10/2004 | Bleckmann et al. | |
| 2004/0234458 A1 | 11/2004 | Riedel et al. | |
| 2005/0042151 A1 | 2/2005 | Alward et al. | |
| 2005/0079975 A1 | 4/2005 | Fujita | |
| 2005/0272602 A1 | 12/2005 | Ninomiya | |
| 2006/0120937 A1 | 6/2006 | Zuberi | |
| 2007/0068128 A1 | 3/2007 | Oshimi et al. | |
| 2007/0092692 A1 | 4/2007 | Masukawa et al. | |
| 2007/0111878 A1 | 5/2007 | Zuberi et al. | |
| 2007/0152364 A1 | 7/2007 | Zuberi et al. | |
| 2008/0155951 A1 | 7/2008 | Riesmeier et al. | |
| 2008/0254254 A1 | 10/2008 | Ohno | |

\* cited by examiner

*Primary Examiner*—Timothy C Vanoy
*Assistant Examiner*—Michelle Hou (57) ABSTRACT

A porous ceramic body comprises a plurality of fibers and a bonding system bonding a portion of at least two fibers of the plurality of fibers. The plurality of fibers has a first coefficient of thermal expansion. The bonding system has a second coefficient of thermal expansion lower than the first coefficient of thermal expansion. In some embodiments, when the plurality of fibers and the bonding system are combined the resulting porous ceramic body has a third coefficient of thermal expansion which is at least about 10% less than the first coefficient of thermal expansion.

25 Claims, 8 Drawing Sheets

LOW COEFFICIENT OF THERMAL EXPANSION BONDING SYSTEM FOR A HIGH POROSITY CERAMIC BODY AND METHODS OF MANUFACTURE

RELATED APPLICATIONS

This application is a continuation-in-part of application Ser. No. 11/748,306, filed on May 14, 2007 and entitled "Method and Apparatus for an extruded ceramic biosoluble fiber substrate." This application is also a continuation-in-part of application Ser. No. 11/831,398, filed on Jul. 31, 2007 and entitled "A fiber-based ceramic substrate and method of fabricating the same." The entire disclosures of application Ser. Nos. 11/748,306 and 11/831,398 are incorporated herein by reference.

FIELD OF THE INVENTION

The invention generally relates to a bonding system in a high porosity ceramic body, and more particularly to a low coefficient of thermal expansion bonding system used to adjoin fibers to form the ceramic body and methods of manufacturing the ceramic body.

BACKGROUND

Advanced ceramic materials are commonly utilized in systems located in hostile environments, such as, for example, automotive engines (e.g., catalytic converters), aerospace applications (e.g., space shuttle titles), refractory operations (e.g., firebrick) and electronics (e.g., capacitors, insulators). Porous ceramic bodies are of particular use as filters in these environments. For example, today's automotive industry uses ceramic honeycomb substrates (i.e., a porous ceramic body) to host catalytic oxidation and reduction of exhaust gases, and to filter particulate emissions. Ceramic honeycomb substrates provide high specific surface area for filtration and support for catalytic reactions and, at the same time, are stable and substantially structurally sound at high operating temperatures associated with an automotive engine environment.

In general, many of today's advanced porous ceramic bodies are formed out of composite ceramic materials (i.e., a combination of different ceramic materials and/or phases of ceramic materials). Composite materials allow for tailoring a material's characteristics for a particular use. That is, two or more different materials and/or phases of a single material can be combined to produce a resulting composite material, which has material characteristics controlled by the proportions and locations of the different materials and/or phases used to form the composite. As a result of using composite materials in hostile environments, such as, for example, extreme temperature environments, cracking may result due to differences in thermal expansion characteristics of the combined materials. In addition, unwanted expansion of a high coefficient of thermal expansion material within the composite can also occur causing design restraints and inefficiencies.

SUMMARY OF THE INVENTION

In general, embodiments described herein provide porous ceramic composite materials and methods for making them. The porous ceramic composite material includes a plurality of fibers bonded with a low coefficient of thermal expansion material. Specifically, the porous ceramic composite materials are ceramic bodies formed of a plurality of fibers that have a first coefficient of thermal expansion and a bonding system that has a second coefficient of thermal expansion. The second coefficient of thermal expansion is lower than the first coefficient of thermal expansion, so that when the fibers and bonding system are combined the resulting porous ceramic body has a third coefficient of thermal expansion that is between the first and second coefficients. In general, the bonding system is created during processing of the porous ceramic body. That is, a bonding system having a low coefficient of thermal expansion is created by reacting two or more constituents to form the bonding system. As a result of utilizing a low coefficient of thermal expansion material for the bonding system, a porous ceramic body with minimal cracking and minimal expansion at high temperatures can be generated.

In one aspect, embodiments described in the present disclosure are directed to a porous ceramic body including a fibrous substrate including a plurality of fibers having a first coefficient of thermal expansion, and a bonding system having a second coefficient of thermal expansion. The second coefficient of thermal expansion is lower than the first coefficient of thermal expansion. The bonding system bonds a portion of at least two fibers of the plurality of fibers to form a porous ceramic body.

Embodiments of this aspect of the invention can include one or more of the following features. In some embodiments the porous ceramic body has a coefficient of thermal expansion, which is at least about 10% less (e.g., 10%, 15%, 20%, etc.) than the first coefficient of thermal expansion. In certain embodiments the porous ceramic body has a coefficient of thermal expansion, which is greater than about 20% less (e.g., 25%, 30% 40%, 50%, 60%, 70%, etc.) than the first coefficient of thermal expansion. The bonding system utilized in the porous ceramic body can comprise a single-phase material, such as, for example, a glass, a glassy-ceramic, a ceramic, or metal. In other embodiments, the bonding system is a multiphase material. That is, the bonding system includes two or more phases. The fibers utilized in the porous ceramic body can be any type of ceramic fiber, including but not limited to, glass fiber, such as E-glass fiber or S-glass fiber, refractory ceramic fiber, such as, aluminosilicate fiber, mullite fiber, alumina fiber, or silicon carbide fiber, biosoluble fiber, such as, vitreous magnesium-silicate fiber or calcium silicate fiber. In general, the fibers will have an aspect ratio greater than 1 but less than or equal to 2,000. Generally, the fibers have a diameter ranging from about 100 nm to about 100 microns. In certain embodiments, the fibers have a diameter ranging between about 100 nm and about 10 microns, and in some embodiments the fiber diameter ranges between 2 microns and 10 microns.

In another aspect, embodiments described herein are directed to a porous ceramic body that includes a plurality of fibers bonded with a bonding system having a lower coefficient of thermal expansion than a coefficient of thermal expansion of the fibers. The bonding system adjoins at least a portion of adjacent fibers within the plurality of fibers to form a porous ceramic body having a porosity of greater than about 20 percent. The bonding system forming between about 10 volume percent and about 60 volume percent of the ceramic body (that is, about 10 to about 60 volume percent of the material forming the ceramic body excluding the pores).

Embodiments of this aspect of the invention can include one or more of the following features. In some embodiments the porous ceramic body has a coefficient of thermal expansion, which is at least about 10% less than the coefficient of thermal expansion of the fibers. In certain embodiments the porous ceramic body has a coefficient of thermal expansion, which is greater than about 20% less than the first coefficient of thermal expansion. The bonding system utilized in the porous ceramic body can comprise a single-phase material, such as, for example, a glass, a glassy-ceramic, a ceramic, or a metal. In other embodiments, the bonding system is a multiphase material. That is, the bonding system includes two or more phases. The fibers utilized in the porous ceramic body can be any type of ceramic fiber, including but not limited to, glass fiber, such as E-glass fiber or S-glass fiber, refractory ceramic fiber, such as, aluminosilicate fiber, mullite fiber, alumina fiber, or silicon carbide fiber, biosoluble fibers, such as, vitreous magnesium-silicate fiber or calcium silicate fiber. In general, the fibers will have an aspect ratio greater than 1 but less than or equal to 2,000. Generally, the fibers have a diameter ranging from about 100 nm to about 100 microns. In certain embodiments, the fibers have a diameter ranging between about 100 nm and about 10 microns, and in some embodiments the fiber diameter ranges between 2 microns and 10 microns. In certain embodiments, the porous ceramic body further includes a catalytic coating disposed on at least a portion of the plurality of fibers.

In another aspect, embodiments described herein are directed to a method of forming a porous body. The method includes providing a mixture including a plurality of fibers having a first coefficient of thermal expansion and at least two reactive constituents; forming a fibrous body from the mixture, and reacting the at least two reactive constituents to form a bonding system having a second coefficient of thermal expansion which is lower than the first coefficient of thermal expansion. The bonding system adjoins a portion of at least two fibers within the plurality of fibers to form the porous body.

Embodiments of this aspect of the invention can include one or more of the following features. In some embodiments the porous ceramic body formed by using the method has a third coefficient of thermal expansion, which is at least about 10% less than the first coefficient of thermal expansion. In certain embodiments the porous ceramic body has a coefficient of thermal expansion, which is greater than about 20% less than the first coefficient of thermal expansion. To form the fibrous body, known extrusion methods can be used to extrude the mixture. In other embodiments, the mixture can be molded or otherwise shaped. In certain embodiments, the bonding system includes a single-phase material, such as a glass, a ceramic, a glassy-ceramic, or metal. In other embodiments, the bonding system may be a composite or may be a microcracked material. In other embodiments, the bonding system comprises a multiphase material. The mixture utilized in this aspect of the invention can further include one or more additives selected from the group consisting of a fluid, a binder, and a pore former. These additives can be used to create a desired consistency for extruding or shaping the mixture into the fibrous body. In other embodiments, one or more of these additives increases the porosity of the resulting porous ceramic body. In certain embodiments, the additives can be substantially removed by heating the fibrous body.

In another aspect, embodiments described herein are directed to a porous honeycomb body. The honeycomb body includes a honeycomb array of walls defining channels between adjacent walls. The walls include a plurality of fibers bonded to form a porous structure having an open network of pores. The honeycomb body, i.e., the array of walls, have a lower coefficient of thermal expansion than that of the plurality of fibers.

Embodiments of this aspect of the invention can include one or more of the following features. The honeycomb body can be utilized to form a filter, such as, for example, a filter for diesel exhaust. In one embodiment, the filter can include a housing including an inlet and an outlet with the porous honeycomb body disposed therebetween. In some embodiments, the filter can further include at least one catalyst (e.g., a catalytic coating) deposited on the plurality of fibers of the walls.

In another aspect, embodiments described herein are directed to a method of forming a porous honeycomb substrate. The method includes mixing a plurality of fibers, fluid, and two or more reactive constituents to form an extrudable mixture; extruding the mixture into a honeycomb substrate; heating the honeycomb substrate to remove the fluid; and reacting the two or more reactive constituents to form a bonding material between a portion of at least two fibers within the plurality of fibers. The bonding material formed by the reaction has a lower coefficient of thermal expansion than the plurality of fibers.

BRIEF DESCRIPTION OF THE DRAWINGS

In the drawings, like reference characters generally refer to the same parts throughout the different views. Also, the drawings are not necessarily to scale, emphasis instead being placed upon illustrating the principles of the invention.

DETAILED DESCRIPTION

The rising cost of fossil fuels together with environmental concerns has created a growing desire to increase efficiencies while maintaining performance of automobiles. Improving the efficiencies of diesel automobiles (e.g., diesel cars, diesel trucks, diesel buses) is especially important due to their market share particularly in highly populated areas. Utilizing composite ceramic materials as filters for diesel applications may help to achieve these efficiencies. For example, ceramic materials tend to be lighter in weight than other materials, such as metals. In addition, ceramic materials can withstand high temperature hostile environments, such as the environment surrounding a catalytic filter. Moreover, composite ceramic materials can be tailored to provide optimal material characteristics.

In diesel automotive applications, using composite ceramic materials that have a high coefficient of thermal expansion within a catalytic filter can lead to poor or diminished performance and/or design flexibility. Specifically, diesel filters are prone to cracking during regeneration (i.e., a high temperature cycle used to burn out particulates trapped in the filter). Therefore, it would be advantageous to minimize the coefficient of thermal expansion of a composite material used in a diesel filter. In addition, performance of a diesel filter increases with an increased value for the thermal shock parameter (TSP). The thermal shock parameter is defined as follows: TSP=modulus of rupture (MOR) divided the product of Young's modulus and the coefficient of thermal expansion for the composite material. As a result, a composite material having a low coefficient of thermal expansion will have greater performance.

Figure 1:
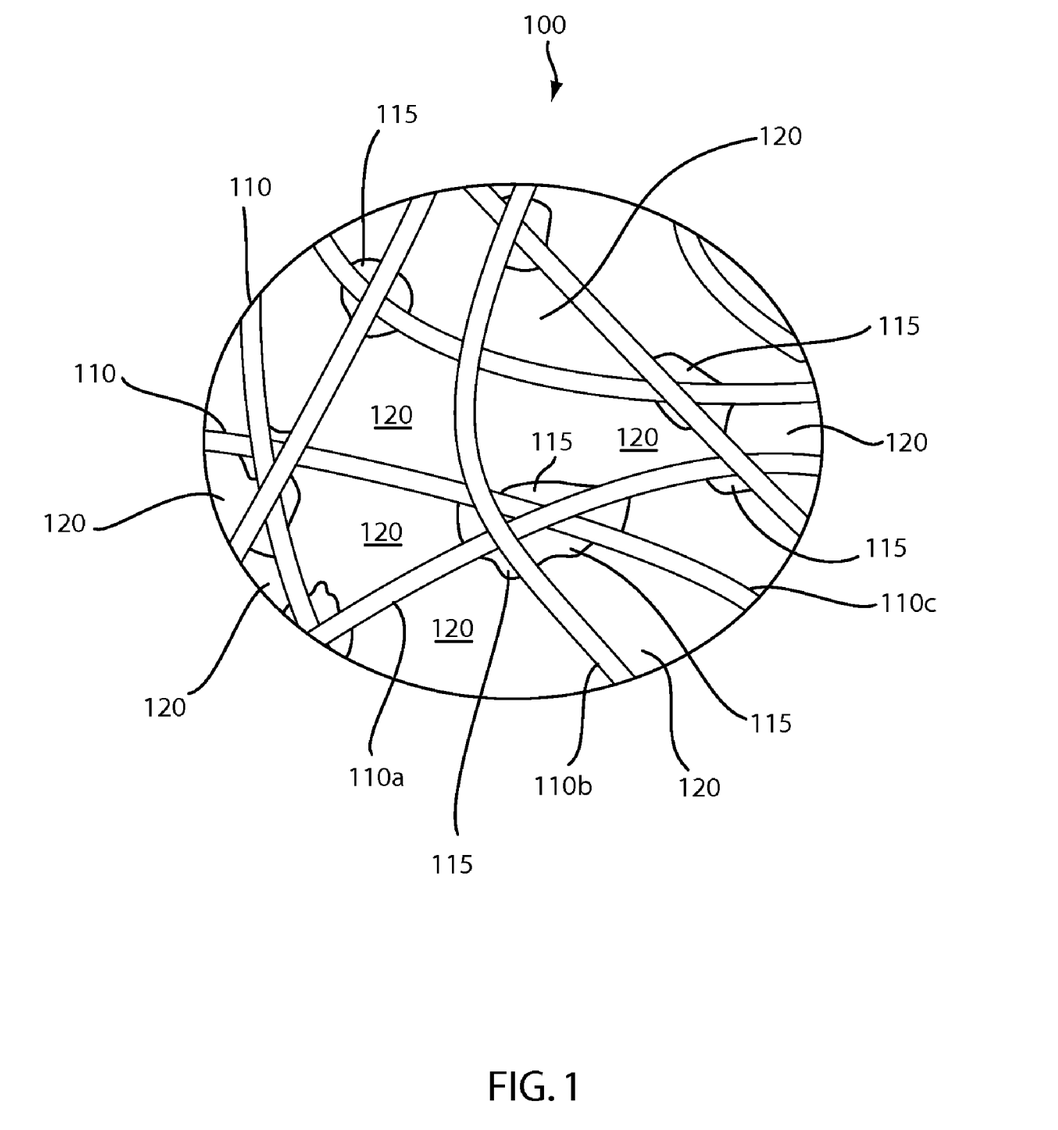
FIG. 1 is a cross-sectional schematic of a portion of a porous ceramic body in accordance with an embodiment of the present disclosure.

Now turning to the figures, a portion of a porous ceramic body 100 that can be used within a catalytic filter in a diesel engine is shown in FIG. 1. The porous ceramic body 100 includes a plurality of fibers 110 and a bonding system 115. The bonding system 115 adjoins a portion of two or more adjacent fibers (e.g., 110a, 110b, and 110c) to form the structure of the ceramic body 100. The adjoined fibers, such as, for example, 110a, 110b, and 110c, define pores 120 within the ceramic body 100. In general, the amount of porosity within the porous ceramic body 100 can be selected at any value (e.g., greater than 0 percent but less than 99 percent). In certain embodiments, the porosity within the ceramic body 100 is at least about 20 percent. In some embodiments, the porosity of the ceramic body is greater than about 20 percent (e.g., 25 percent, 30 percent, 35 percent, 40 percent, 45 percent, 50 percent, 55 percent, 60 percent, 65 percent, 70 percent, 75 percent, 80 percent, etc.). In certain embodiments, the ceramic body 100 includes an open network of porosity. That is, the pores 120 form passageways such that fluids (e.g., gas) can flow through the ceramic body 100.

The fibers 110 and the bonding system 115 are combined to form the porous ceramic body 100 (i.e., a composite ceramic body). The presence of both the fibers 110 and the bonding system 115 within the porous ceramic body 100 affects the material properties of the composite material. That is, the material properties of the porous ceramic body 100 are dependent upon the material properties and the relative amounts of the fibers as well as the bonding system 115. Thus, the material properties of the composite material (i.e., the ceramic body 100) can be tailored for a specific application by the selection of specific concentrations of the fibers, bonding systems, as well as potentially, the sizes, shapes, distribution, and orientations of the fibers and bonding system. For example, the coefficient of thermal expansion of the porous ceramic body 100 (i.e., $\alpha_{ceramic\ body}$) for an embodiment of the invention can be generally defined as follows:

$$\alpha_{ceramic\ body} = \alpha_{fiber} + V_{bonding\ system}(\alpha_{bonding\ system} - \alpha_{fiber})$$

wherein the sum of the volume fractions of the bonding system and the fibers (i.e., $V_{bonding\ system}$ and $V_{fiber}$) equals 1 (i.e., 100%).

In the ceramic bodies of the present invention (e.g., ceramic body 100) the fibers 110 have a coefficient of thermal expansion that is greater than the coefficient of thermal expansion of the bonding system 115. That is, $\alpha_{fiber}$ (also referred to within as the first coefficient of thermal expansion) is greater than $\alpha_{bonding\ system}$ (also referred to within as the second coefficient of thermal expansion). In some embodiments, the second coefficient of thermal expansion is about 15% or more (e.g., 20%, 25%, 30%, etc.) less than the first coefficient of thermal expansion. A consequence of utilizing a bonding system that has a lower coefficient of thermal expansion than the fibers is a ceramic body 100 that has a coefficient of thermal expansion that is less than that of the fibers. In addition, by utilizing a volume fraction between about 40% and about 99%, the value of the coefficient of thermal expansion of the ceramic body 100 is dominated or weighted by the coefficient of thermal expansion of the bonding system. For example, if fibers having a coefficient of thermal expansion of 5 are combined with a bonding system that has a coefficient of thermal expansion of 4 with the volume fraction of the bonding system ($V_{bonding\ system}$) being 0.75, the resulting coefficient of thermal expansion for the composite is 4.25, which is 15% less than the coefficient of thermal expansion of the fibers but only 6% more than the coefficient of thermal expansion of the bonding system.

Materials for the bonding system that exhibit microcracks can also be used to effectively lower the coefficient of thermal expansion of the bonding system 115 and thus, reduce the coefficient of thermal expansion of the ceramic body 100. Microcracked materials used as a component in the bonding system 115 have a low apparent coefficient of thermal expansion due to the presence of sub-micron sized cracks or fissures that close due to expansion of the material during heating and open during cooling, to moderate the accumulation of stress during temperature excursions. For example, alumina ($Al_2O_3$) and titanium oxide, or titania ($TiO_2$) can react to form aluminum titanate ($Al_2TiO_5$), which is an orthorhombic crystal structure that forms a stable microcracked structure in sintered polycrystal or amorphous materials. In this example, the aluminum titanate material can provide a low apparent coefficient of thermal expansion material that forms ceramic bonds between adjoining fibers 110 in the ceramic body 100. The aluminum titanate material can be reaction-formed through the addition of alumina based constituents and titanium based constituents. Similarly, the reaction-formation of aluminum titanate can be performed through a reaction with alumina or titania-based additives with alumina and/or titania constituents from the composition of the fiber 110, to form a microcracked aluminum titanate structure within a matrix of silica-based glass.

Figure 2:
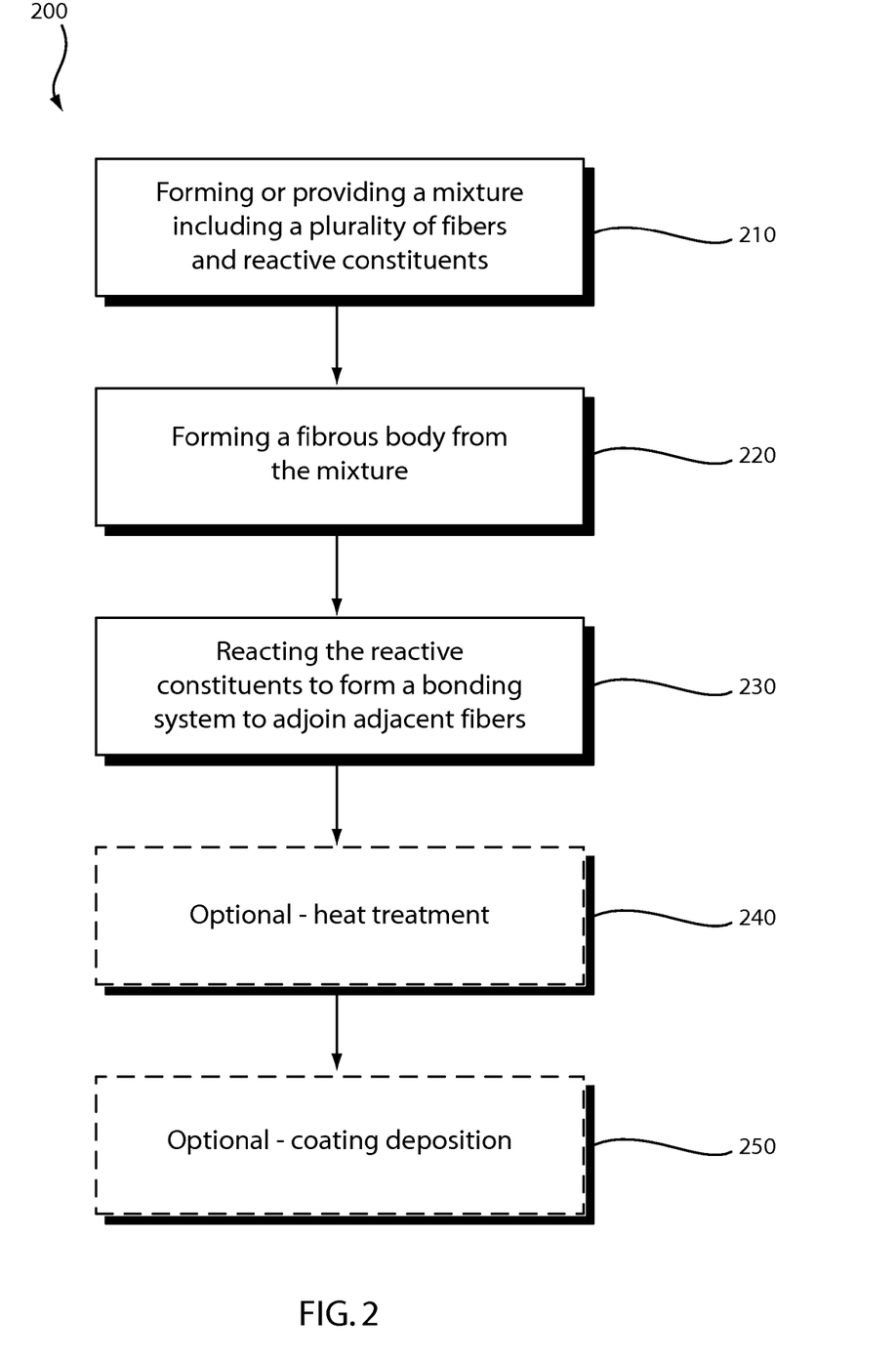
FIG. 2 is a schematic illustrating a method of forming a porous ceramic body in accordance with an embodiment of the disclosure.
Figure 3A:
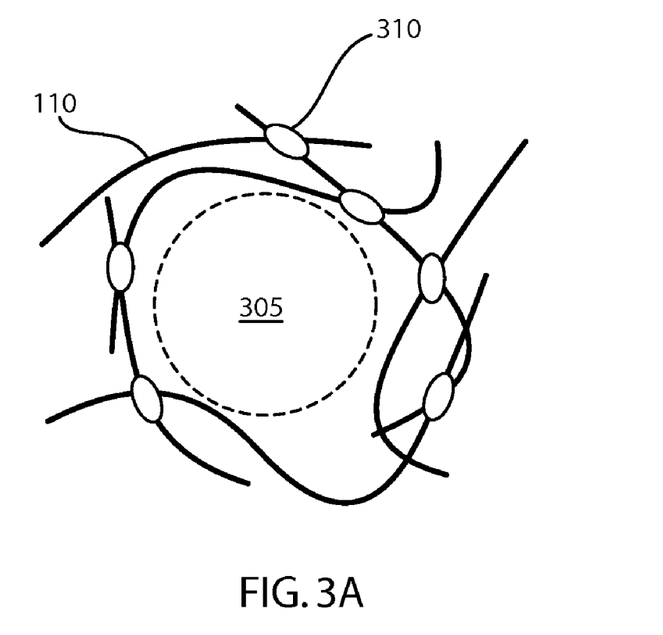
FIGS. 3A and 3B are cross-sectional schematics illustrating the presence and the absence of pore formers and binders prior to and after a heat treatment, respectively.
Figure 3B:
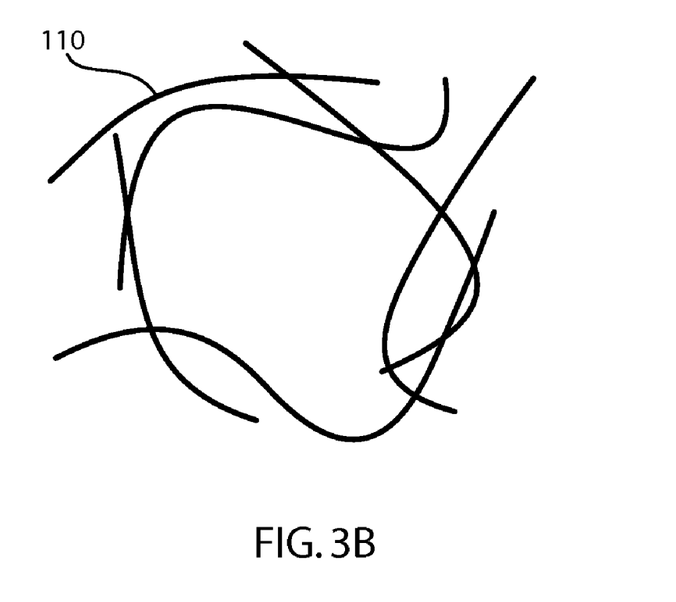

Referring to FIG. 2, a method of forming a porous body, such as, for example ceramic body 100, includes three steps, 210, 220, and 230. First, in step 210, a mixture including a plurality of fibers (e.g., fibers 110) and constituents used to form the bonding system (e.g., 115) are mixed together. The constituents can have the form of particles, powders, fibers, or liquids. This mixture can be made ahead time by a separate entity and provided to the porous body manufacturer. In addition to the fibers and the constituents used to form the bonding system, other additives, such as, for example, pore formers and rheology modifiers (e.g., fluids, binders, plasticizers), can be added to the mixture. The pore formers provide additional open space within the porous ceramic body 100 and rheology modifiers aid in the shaping or forming of the mixture. Next, as shown in step 220, the mixture is used to form a fibrous body. In some embodiments, the mixture can be extruded, molded, or otherwise shaped into a form. The form can be heated to remove some or all of the pore formers and rheology modifiers (See FIGS. 3A and 3B showing the presence and the removal of pore formers 305 and binders 310, respectively). As a result, the excess water and additives are reduced or eliminated to enable fiber-to-fiber contact. Further heating allows the creation of bonds between the fibers. It will be appreciated that the bonds may be formed in several ways. For example, the fibers may be heated to allow the formation of a liquid assisted sintered bond at an intersection of two fibers. In other embodiments, the bonds are caused by the presence of inorganic binders within the mixture that hold the fibers together in a connected network and do not burn off during step 220. Finally, the constituents within the mixture are reacted to form the bonding system at step 230. That is, the constituents are reacted (e.g., a reaction occurs between the constituents) to form the bonding system 115 that has a lower coefficient of thermal expansion than the fibers 110. In one embodiment, the form is heated to initiate the reaction of the constituents. In general, the constituents tend to deposit along fiber intersections during step 230, such that when reacted the bonding system 115 adjoins adjacent fibers (e.g., 110a, 110b, 110c in FIG. 1) to strengthen the form and to create the porous ceramic body. Examples of reactive constituents are illustrated in Table 1 below:

TABLE 1

Examples of Reactive Constituents and Resulting Bonding Systems

| Constituents | Resulting Bonding System |
|---|---|
| titania + alumina + silica + magnesia powders + calcium oxide clay | aluminum titanate + glass |
| titania powder + mullite fiber | aluminum titanate + glass |
| Barium carbonate powder + colloidal silica | barium alumina silicate |
| lithium alumina oxide powder + colloidal silica | β-eucryptite |

Additional heat treatments and/or coatings of the ceramic body (e.g., catalytic coatings) can also be applied as shown in optional steps 240 and 250.

Figure 4:
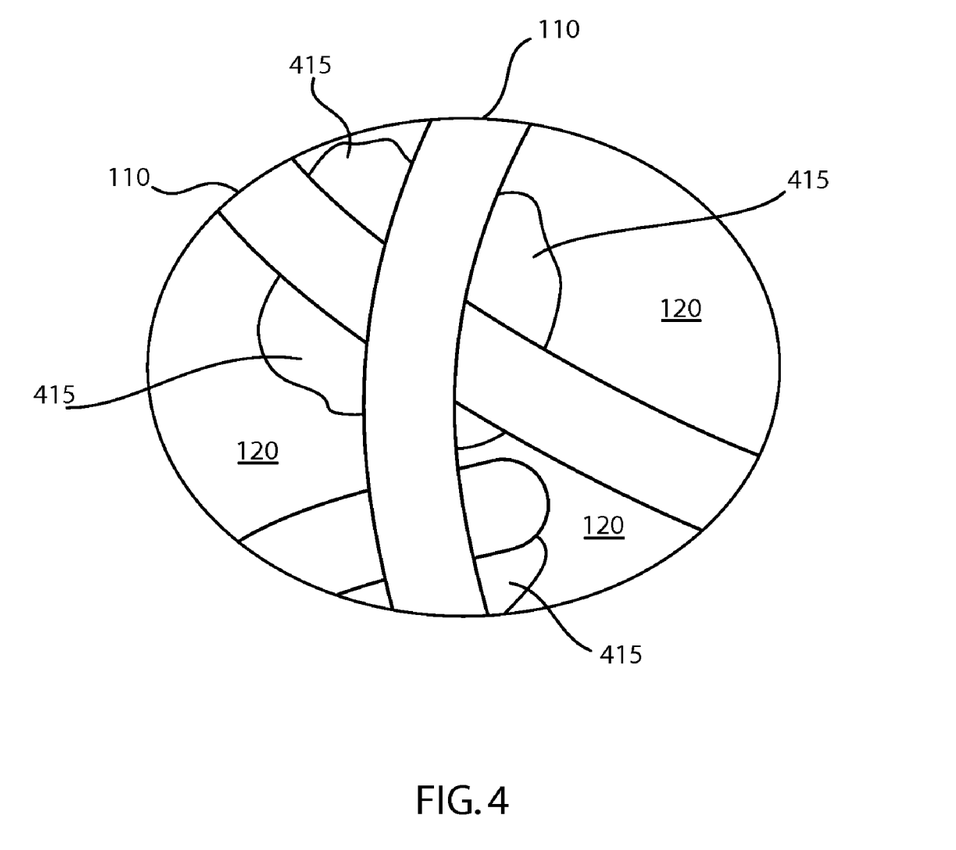
FIG. 4 is a cross-sectional schematic illustrating an enlarged portion of a porous ceramic body.
Figure 5:
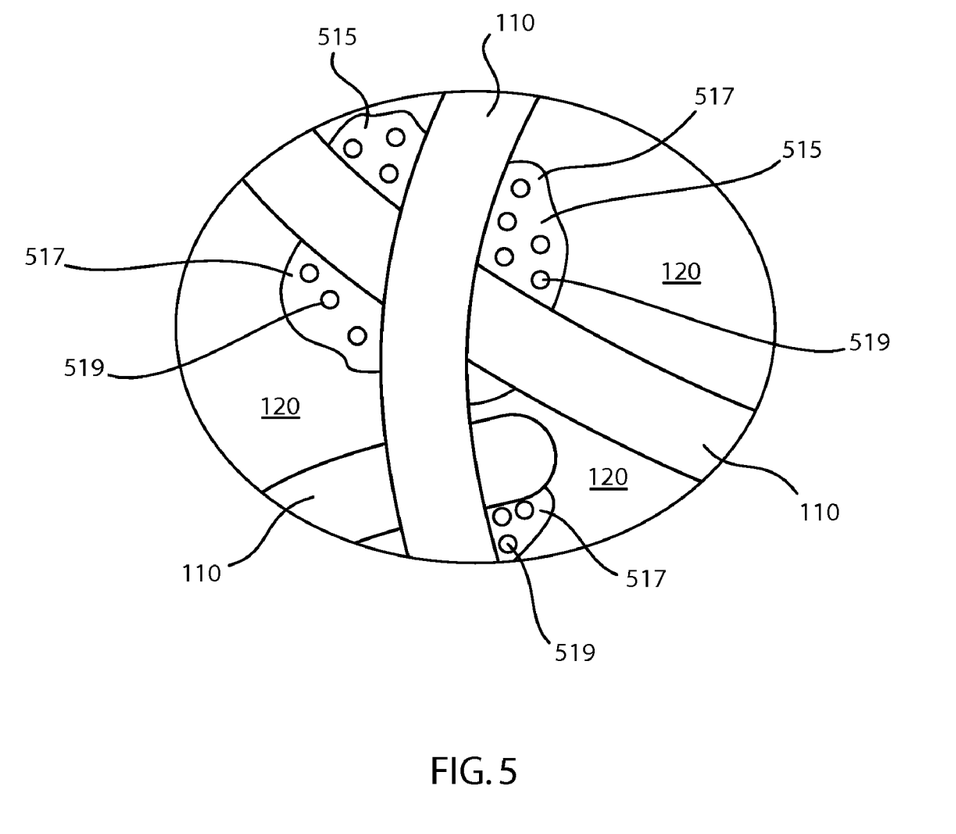
FIG. 5 is a cross-sectional schematic illustrating a portion of a different embodiment of the porous ceramic body.

The bonding system formed in step 230 shown in FIG. 2 has a lower coefficient of thermal expansion than the coefficient of thermal expansion of the fibers. While all bonding systems generated using method 200 have this characteristic, the bonding system itself has numerous embodiments. For example, referring to FIG. 4, the bonding system 415 can be a single-phase material, such as, for example, a glass, a ceramic, a glassy-ceramic, or metal. That is, the constituents react to form a single-phase material that adjoins a portion of two or more fibers 110. In another embodiment, depicted in FIG. 5, the bonding system 515 can be a two-phase material, in which the constituents react to form a matrix including a first phase material 517 and deposits within the matrix of a second phase material 519. For example, in one embodiment, the first phase material 517 comprises a glass and the second phase material comprises a glassy-ceramic. Other material/phase compositions are also possible. For example, the first phase material 517 can consist of a ceramic material and the second phase material 519 can include a glass. In another illustrative embodiment, the first phase 517 consists of a first glass and the second phase consists of a second glass 519. In yet another embodiment, the first phase 517 includes a ceramic and the second phase includes a metal.

Figure 6:
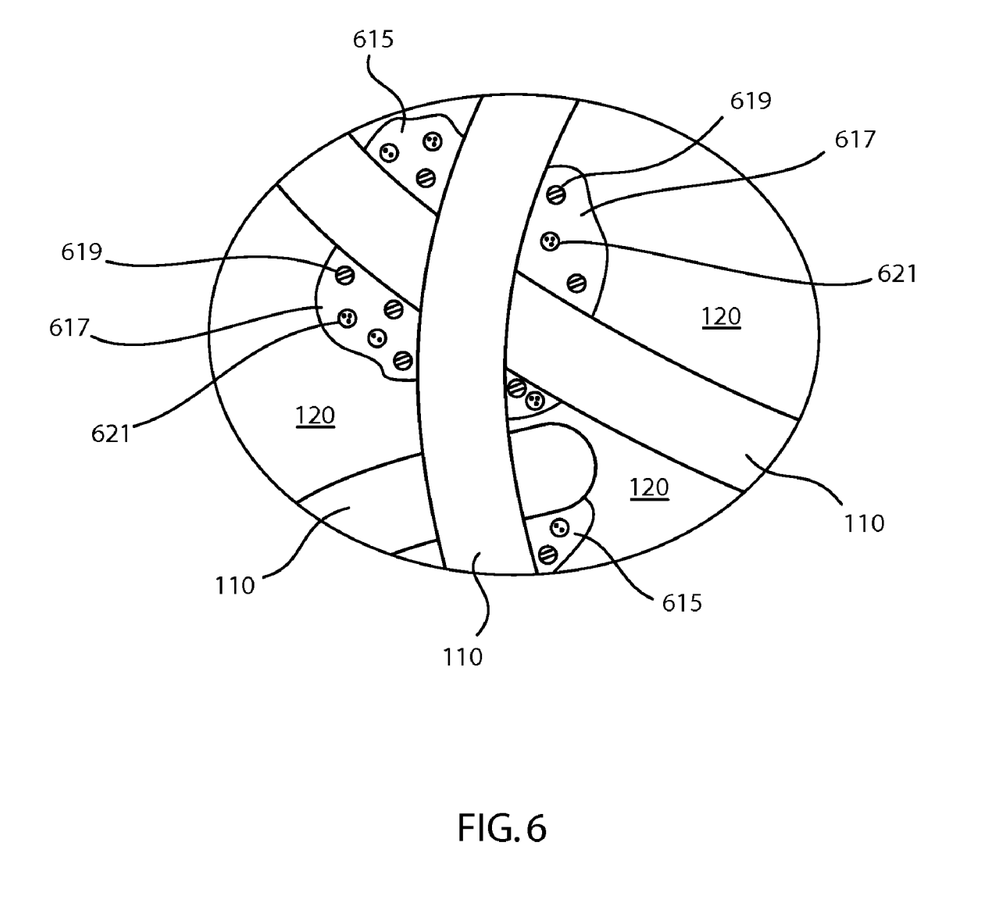
FIG. 6 is a cross-sectional schematic illustrating a portion of another embodiment of the porous ceramic body.

Referring to FIG. 6, another bonding system 615 that can be used within a porous ceramic body includes a first phase 617, a second phase 619, and a third phase 621. An illustrative bonding system in accordance this embodiment includes a first phase 617 formed of a glass, a second phase 619 formed of a glassy-ceramic, and a third phase 621 formed of a ceramic. Other embodiments of a three phase bonding system are also possible. In addition, it should also be understood that any number of phases/materials (e.g., one, two, three, four, five, etc.) can be utilized to form a bonding system. That is, a bonding system formed from the reactive constituents described in step 210 and 230 of method 200 can include any number of materials and/or phases so long as the coefficient of thermal expansion of the bonding system is lower than the coefficient of thermal expansion of the fibers. The ceramic body of the present invention will be predominately fibrous in that the bonding system, as a single phase, or multiple-phase composition, will generally account for approximately 5% to 49% by volume.

An illustrative list of glasses utilized in forming bonding systems includes: silica glass, borosilica glass, $TiO_2$—$SiO_2$, yttrium disilicate ($Y_2O_3$—$SiO_2$), cerium silicate ($CeO_2$—$SiO_2$), $Cu_2O$—$Al_2O_3$—$SiO_2$ and phosphate glasses An illustrative list of glassy-ceramics utilized in forming bonding systems includes: cordierite, calcium aluminate, β-spodumene, β-Eucryptite, $Zr_2P_2O_9$, Beryl ($Be_3Al_2Si_6O_{18}$), barium aluminosilicate ($BaAl_2Si_2O_8$), strontium aluminosilicate ($SrAl_2Si_2O_8$), sodium zirconium phosphate ($NaZr_2(PO_4)_3$), zirconia calcium titanium phosphate ($CaZr_4P_6O_{24}$), and zirconium tungstate ($ZrW_2O_7$, or $ZrV_2O_7$). An illustrative list of ceramics utilized in forming bonding systems includes: aluminum titanate, zirconium titanium oxide ($ZrTiO_4$), hafnium titanate ($HfriO_4$), silicon carbide, silicon nitride, aluminum nitride, and lead magnesium niobate (PMN).

The fibers 110 utilized within the porous ceramic body, such as body 100 shown in FIG. 1, are ceramic fibers. These fibers have an aspect ratio (i.e., the ratio of the length of the fiber divided by the diameter of the fiber) greater than one. A fiber is a material formed with an intended length that is greater than the diameter, for example, an aspect ratio greater than one, or greater than about three, though a fiber is not intended to include monocrystalline structures, such as whiskers, or particles naturally occurring as an elongated, or non-spherical form, nor agglomerates of particles that may exhibit deviations from generally spherical shapes or forms. Fibers, which can be naturally occurring, or synthetically formed, are know in the art, and are typically used for refractory products, such as insulation in blanket, mats, and blocks. As used herein, the "diameter" of the fiber assumes for simplicity that the sectional shape of the fiber is a circle; this simplifying assumption is applied to fibers regardless of their true section shape (e.g., square, triangular, etc.) In certain embodiments, the fibers have an aspect ratio that is less than or equal to 2,000. That is, in certain embodiments, the fibers have a diameter in the micron or submicron range (e.g., 1 micron) while the length of the fibers is a few millimeters (e.g., 2 millimeters). In general, the fibers can have a diameter ranging from about 100 nm to about 100 microns. However, in certain embodiments, the fibers have a diameter within the range of about 100 nm to about 10 microns and in some embodiments, the fibers have a diameter within the range of about 2 microns to about 10 microns. The fibers can be formed of any type of ceramic material, such as refractory ceramic fibers (e.g., aluminosilicate fibers). In some embodiments, the fibers are biosoluble, meaning that the fibers are soluble within a human or living organism. An illustrative list of ceramic fibers utilized in method 200 include, without limitation, alumina, silica, zirconia, titanium oxide, aluminosilicate, mullite, aluminoborosilicate, silicon carbide, silicon nitride, aluminum nitride, silicon oxynitride, silicon carbonitride, cordierite, beta spodumene, hydroxyapetite, yttrium aluminum garnet, alumina-enhanced thermal barrier, alumina silica zirconia, alumina silica chromia, magnesium silicate, magnesium strontium silicate, magnesium calcium strontium silicate, strontium aluminum silicate, lithium aluminum silicate, aluminum titanate, strontium titanium, titanium carbide, calcium aluminosilicate, "ISOFRAX" a biosoluble vitreous magnesium-silicate fiber from Unifrax Corporation, Niagra Falls, N.Y., and "SUPERWOOL" a biosoluble family of products from Thermal Ceramics, of Augusta Ga.

Figures 7, 8:
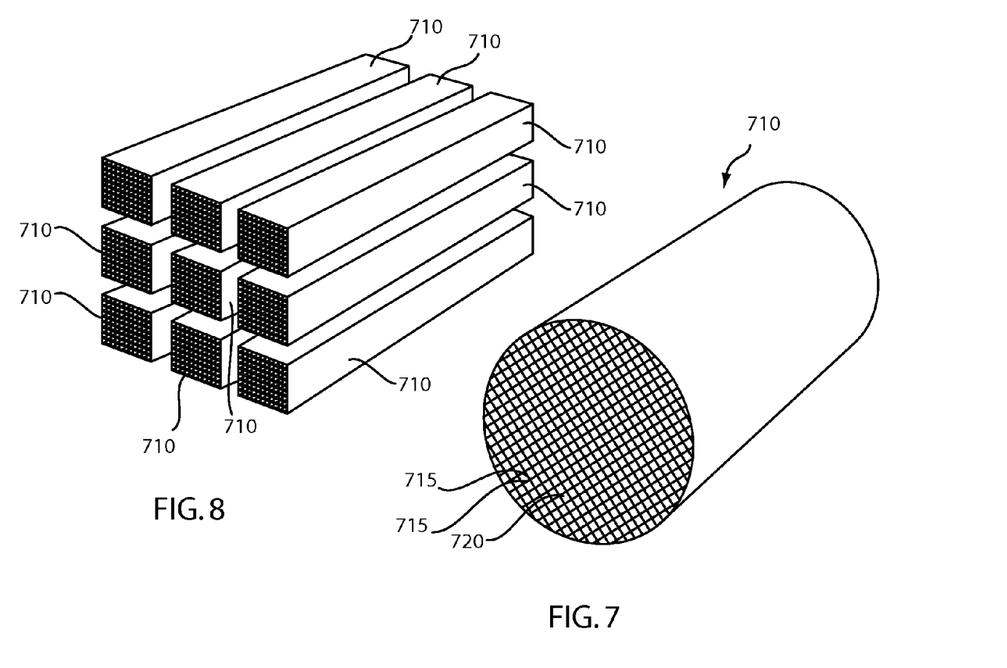
FIG. 7 is a schematic illustrated in a perspective view showing a honeycomb body.
FIG. 8 is a schematic illustrated in a perspective view showing multiple honeycomb bodies to be adjoined to form a larger body.

Referring to FIG. 7, a porous honeycomb body 710 is shown. The honeycomb body 710 has an array of walls 715 that define channels 720 between adjacent walls 715. The walls 715 comprise the porous ceramic body (e.g., body 100) described above. That is, the walls 715 include a plurality of fibers bonded with a low coefficient of thermal expansion bonding system to form a porous structure having an open network of pores. Due to the low coefficient of thermal expansion of the bonding system, the walls have a lower coefficient of thermal expansion than the plurality of fibers. The honeycomb body 710 can be fabricated in any number of shapes such as, for example, a cylinder (shown in FIG. 7), a pie-shaped wedge or subcylindrical section, a rectangle (as shown in FIG. 8), or a diamond. These honeycomb bodies 710 can be glued together to form a segmented body as shown in FIG. 8. As a result of gluing the bodies together, any size, shape, or dimension honeycomb form can be generated. With a low coefficient of thermal expansion porous composite material, it is possible to extrude or otherwise form shapes (e.g., cylinders) with large widths (e.g., diameters between 5.66 inches and 14 inches) without utilizing a low Young's modulus glue/adhesive to adjoin smaller segments to form a larger form. The ability to extrude or form larger widths provides a flexibility in production techniques and potential cost reduction in volume production.

Figure 9:
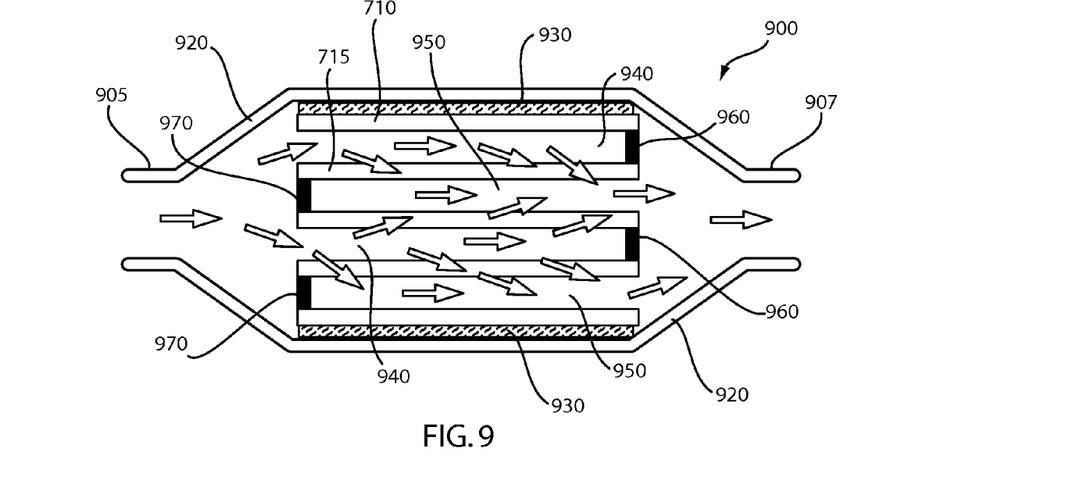
FIG. 9 is a cross-sectional schematic of a filter that includes a honeycomb body of FIG. 7.

FIG. 9 depicts a cross-sectional representation of a filter 900 utilizing the porous honeycomb body 710 of FIG. 7. The filter 900 includes a housing 920, which surrounds the porous honeycomb body 710. The housing includes an inlet 905 and an outlet 907 through which gasses, such as exhaust gasses, travel through. Between the housing 920 and the honeycomb body 710 is a mat 930 that supports and forms an air-tight seal between the housing 920 and the honeycomb body 710. The honeycomb body 710, is configured in a wall-flow configuration by selectively plugging alternate channels, with outlet blocks 960 and inlet blocks 970 to form a plurality of respective inlet channels 940 and outlet channels 950. In this embodiment, the open network of pores within the walls 715 provides sufficient porosity and permeability to permit flow through the walls 715 between the inlet and outlet channels 940, 950. As a result, particulate matter can be accumulated on the surface of the inlet channel walls 940, and be removed from the gas stream by means of the filter 900. Coatings, such as, catalytic coatings or other reactive coatings, can be deposited along or within the walls 715 to increase the oxidation rate of particles captured by the walls 715. For example, for a filter used in a diesel automotive environment, the walls 715 can be coated with a catalytic coating that facilitates oxidation of accumulated soot and accelerates the conversion of exhaust gas into less-harmful constituents. Washcoat and catalytic coatings have to be placed such that they do not disrupt the bonding system matrix composite chemistry and microstructure. Other catalysts can be applied, such as membrane type washcoats and catalysts that can be used for physical and/or chemical separation at the membrane/fluid interface. Techniques for coating composite matrix structures and microcracked structures are well known in the field of art.

Figure 10:
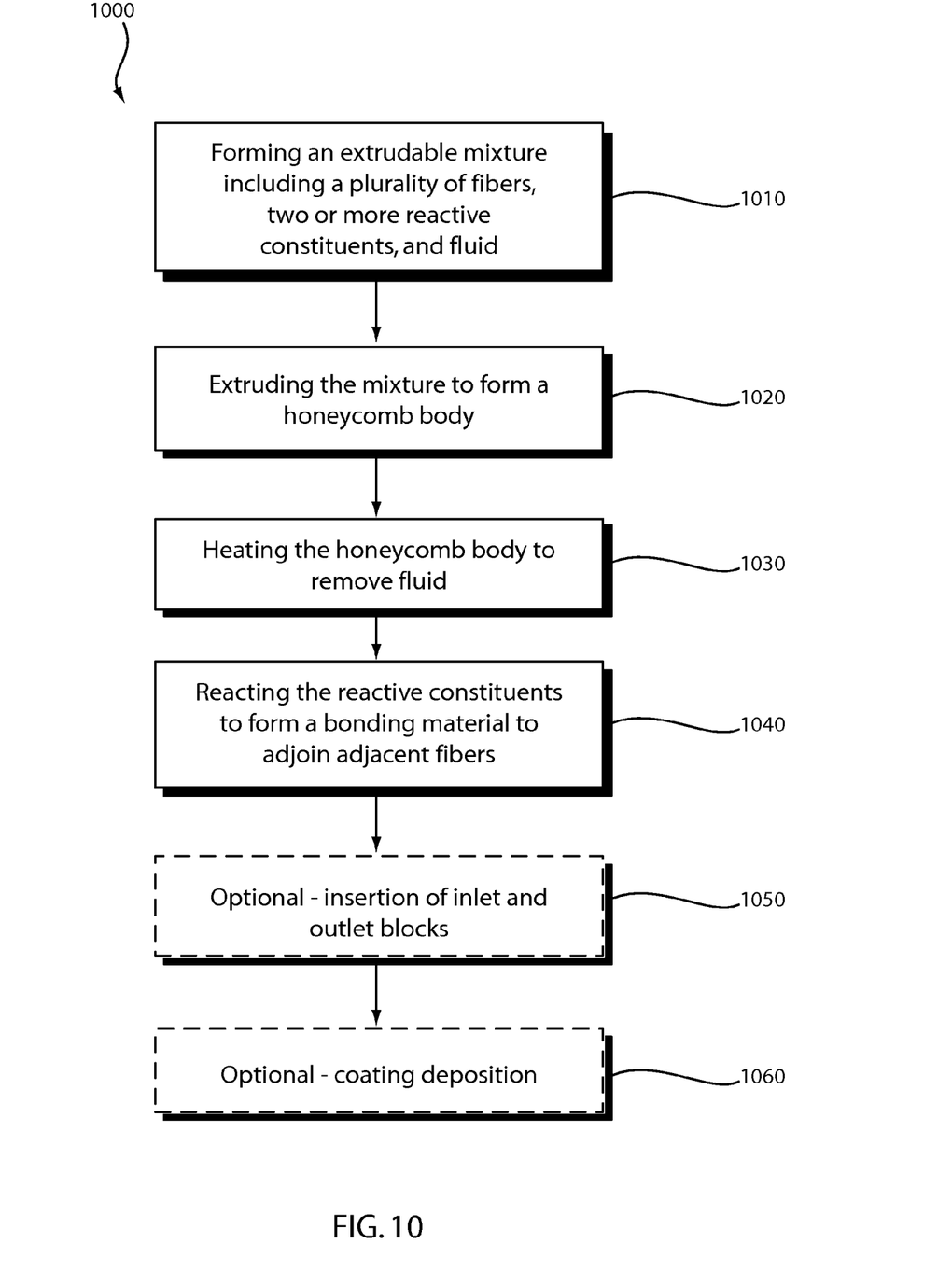
FIG. 10 is a schematic illustrating a method of forming a honeycomb body in accordance with an embodiment of the disclosure.

FIG. 10 illustrates a method of forming a honeycomb body, such as honeycomb body 710 of FIG. 7. First, as shown in step 1010, a plurality of fibers, fluid, and two or more reactive constituents are mixed to form an extruable mixture. The fluid added to the mixture can include rheology modifiers to enable efficient extrusion of the mixture. After obtaining a desired consistency, the mixture is extruded into a honeycomb body (step 1020) and then heated to remove excess fluid (step 1030). Finally, heat or another catalyst is applied to react the two or more reactive constituents to form a bonding material between the fibers (step 1040). The resulting bonding material has coefficient of thermal expansion that is lower than the coefficient of thermal expansion of the fibers. In embodiments where the honeycomb body is a filter, inlet and outlet blocks (e.g., 940, 950 in FIG. 9) are inserted to create a flow path through the filter (optional step 1050), or alternatively, the honeycomb body can be configured as a cross-flow filter wherein the filtrate is forced into and extracted out from the honeycomb body. In addition, a catalytic coating can be applied to the filter to provide the filter with reactive functionality in its intended application, such as, for example, to promote oxidation of captured soot in a diesel particulate filter (optional step 1060).

Variations, modifications, and other implementations of what is described herein will occur to those of ordinary skill in the art without departing from the spirit and scope of the invention. For example, while an number of embodiments of the porous ceramic body have been described as filters, especially filters for diesel applications, the porous ceramic body can be used in any application where a low coefficient of thermal expansion ceramic material would be desired, such as for example, in the aerospace industry, liquid filtration, cross flow filtration, molten metal filtration, fixed bed chemical reactors, honeycomb high surface area adsorbents, and high temperature reactors.

EXAMPLES

The following examples are provided to further illustrate and to facilitate the understanding of the disclosure. These specific examples are intended to be illustrative of the disclosure and are not intended to be limiting.

In a first illustrative example using titania (titanium dioxide, $TiO_2$) as one reactive constituent with mullite fiber (used as a second reactive constituent and as the fiber for forming a fibrous body), an extrudable mixture was prepared with 20.88% by weight polycrystalline mullite fiber with 11.90% by weight titania powder. In this exemplary embodiment, 6.68% by weight hydroxypropyl methylcellulose (HPMC) was used as an organic binder and rheology modifier, with 27.14% by weight carbon particles (−325 mesh grade), and 33.40% by weight deionized water as a mixing fluid. The materials were mixed into the extrudable mixture and formed into 1" diameter honeycomb substrates by extrusion. The substrates were dried using a radio-frequency (RF) drying facility and the organic compounds removed, followed by a sintering operation at 1,500° C. for two hours to form a porous honeycomb structure. In this embodiment, the coefficient of thermal expansion of the porous ceramic body was measured to be $1.2 \times 10{-6}/°$ C., i.e., approximately 76% less than $5 \times 10{-6}/°$ C., the coefficient of thermal expansion of the mullite fiber.

In a second illustrative example using titania and Bentolite (bentonite clay containing at least alumina silica magnesia and calcium oxide clay, available from Southern Clay Products, Gonzales, Tex.) as the reactive constituents with a mullite fiber, an extrudable mixture was prepared with 22.62% by weight polycrystalline mullite fiber with 4.07% by weight Bentolite powder and 4.52% by weight titania powder as the reactive constituents. In this exemplary embodiment, 7.24% by weight hydroxypropyl methylcellulose (HPMC) was used as an organic binder and rheology modifier, with 29.41% by weight carbon particles (−325 mesh grade), and 32.13% by weight deionized water as a mixing fluid. The materials were mixed into the extrudable mixture and formed into 1" diameter honeycomb substrates by extrusion. The substrates were dried using a radio-frequency (RF) drying facility and the organic compounds removed, followed by a sintering operation at 1,500° C. for two hours to form a porous honeycomb structure. In this embodiment, the coefficient of thermal expansion of the porous ceramic body was measured to be $2.5 \times 10\text{-}6/°$ C., i.e., approximately 50% lower than $5 \times 10\text{-}6/°$ C., the coefficient of thermal expansion of the mullite fiber.

In a third illustrative example based on the formation of a BAS (barium alumina silicate) bonding phase using barium carbonate and silica as the reactive constituents with a mullite fiber, an extrudable mixture was prepared with 38.02% by weight mullite fiber with 18.63% by weight barium carbonate powder (sub-micron particle size) and 1.52% by weight colloidal silica (50% solids in water) combined as reactive constituents. In this exemplary embodiment, 6.08% by weight hydroxypropyl methylcellulose (HPMC) was used as an organic binder and rheology modifier, with 7.60% by weight carbon particles (−325 mesh grade), and 28.14% by weight deionized water as a mixing fluid. The materials were mixed into the extrudable mixture and formed into 1" diameter honeycomb substrates by extrusion. The substrates were dried using a radio-frequency (RF) drying facility and the organic compounds removed, followed by a sintering operation at 1,500° C. for one hour to form a porous honeycomb structure. In this embodiment, the coefficient of thermal expansion of the porous ceramic body was measured to be $3.8 \times 10^{-6}/°$ C., i.e., 24% lower than the coefficient of thermal expansion of the mullite fiber, which is $5 \times 10^{-6}/°$ C.

In a fourth illustrative example based the formation of β-eucryptite bonding phase using lithium aluminum oxide and silica as the reactive constituents with a mullite fiber, an extrudable mixture was prepared with 39.06% by weight mullite fiber with 16.41% by weight lithium aluminum oxide powder and 1.56% by weight colloidal silica (50% s in water) as reactive constituents. In this exemplary embodiment, 6.25% by weight hydroxypropyl methylcellulose (HPMC) was used as an organic binder and rheology modifier, with 7.81% by weight carbon particles (−325 mesh grade), and 29.91% by weight deionized water as a mixing fluid. The materials were mixed into the extrudable mixture and formed into 1" diameter honeycomb substrates by extrusion. The substrates were dried using a radio-frequency (RF) drying facility and the organic compounds removed, followed by a sintering operation at 1,500° C. for one hour to form a porous honeycomb structure. In this embodiment, the coefficient of thermal expansion of the porous ceramic body was measured to be $3.0 \times 10^{-6}/°$ C., i.e., 40% lower than the coefficient of thermal expansion of the mullite fiber, which is $5 \times 10^{-6}/°$ C.

In a fifth illustrative example using mullite fiber as one of the reactive constituents with a silicon carbide fiber utilize as another reactive constituent, an extrudable mixture was prepared with 25.51% by weight mullite fiber with 20.41% by weight silicon carbide fibers. In this exemplary embodiment, 8.16% by weight hydroxypropyl methylcellulose (HPMC) was used as an organic binder and rheology modifier, with 10.20% by weight carbon particles (−325 mesh grade), and 35.71% by weight deionized water as a mixing fluid. The materials were mixed into the extrudable mixture and formed into 1" diameter honeycomb substrates by extrusion. The substrates were dried using a radio-frequency (RF) drying facility and the organic compounds removed, followed by a sintering operation at 1,500° C. in an inert environment, such as a vacuum or nitrogen purged kiln, for one hour to form a porous honeycomb structure. In this embodiment, the coefficient of thermal expansion of the porous ceramic body was measured to be $4.5 \times 10^{-6}/°$ C., i.e., 10% lower than the coefficient of thermal expansion of the mullite fiber, which is $5 \times 10^{-6}/°$ C.

We claim:

1. A method of forming a porous body comprising:
   providing a mixture comprising a plurality of fibers having a first coefficient of thermal expansion and at least two reactive constituents;
   forming a fibrous body from the mixture; and
   reacting the at least two reactive constituents to form a bonding system having a second coefficient of thermal expansion which is lower than the first coefficient of thermal expansion, the bonding system adjoining a portion of at least two adjacent fibers within the plurality of fibers to form the porous body, the porous body having pores defined by the plurality of fibers.

2. The method of claim 1, wherein the porous body has a third coefficient of thermal expansion which is at least about 10% less than the first coefficient of thermal expansion.

3. The method of claim 1, wherein the porous body has a third coefficient of thermal expansion which is greater than about 20% less than the first coefficient of thermal expansion.

4. The method of claim 1, wherein forming a fibrous body comprises extruding the mixture.

5. The method of claim 1, wherein the bonding system comprises a single-phase material selected from the group consisting of a glass, a ceramic, and a glassy-ceramic.

6. The method of claim 1, wherein the bonding system comprises a multiphase material.

7. The method of claim 1, wherein the mixture further comprises one or more additives selected from the group consisting of a fluid, a binder, and a pore former.

8. The method of claim 7, wherein the one or more additives are substantially removed by heating the fibrous body.

9. A porous ceramic body comprising:
   a fibrous substrate including a plurality of fibers having a first coefficient of thermal expansion; and
   a bonding system having a second coefficient of thermal expansion lower than the first coefficient of thermal expansion, the bonding system bonding a portion of at least two fibers of the plurality of fibers to form a porous ceramic body, the porous body having pores defined by the plurality of fibers.

10. The porous ceramic body of claim 9, wherein the porous ceramic body has a third coefficient of thermal expansion which is at least about 10% less than the first coefficient of thermal expansion.

11. The porous ceramic body of claim 9, wherein the bonding system is a single-phase material.

12. The porous ceramic body of claim 9, wherein the bonding system is a multiphase material.

13. The porous ceramic body of claim 9, wherein the plurality of fibers are biosoluble.

14. The porous ceramic body of claim 9, wherein the plurality of fibers have an aspect ratio greater than 1 and less than or equal to 2,000.

15. A porous ceramic body comprising:
   a plurality of fibers bonded with a bonding system having a lower coefficient of thermal expansion than a coefficient of thermal expansion of the fibers, the bonding system bonding at least a portion of adjacent fibers within the plurality of fibers, the porous ceramic body having a porosity of greater than about 20 percent, the bonding system forming between about 10 volume percent and about 60 volume percent of the porous ceramic body.

16. The porous ceramic body of claim 15, wherein a coefficient of thermal expansion of the porous ceramic body is at least about 10% less than the coefficient of thermal expansion of the fibers.

17. The porous ceramic body of claim 15, wherein the bonding system is a single-phase material.

18. The porous ceramic body of claim 15, wherein the bonding system is a multiphase material.

19. The porous ceramic body of claim 15, wherein the plurality of fibers are biosoluble.

20. The porous ceramic body of claim 15, wherein the plurality of fibers have an aspect ratio greater than 1 and less than or equal to 2,000.

21. The porous ceramic body of claim 15 further comprising a catalytic coating on the plurality of fibers.

22. A porous honeycomb body comprising:
a honeycomb array of walls defining channels between adjacent walls;
the walls comprising a plurality of fibers bonded to form a porous structure having an open network of pores, the walls having a lower coefficient of thermal expansion than the plurality of fibers.

23. A filter comprising:
a housing including an inlet and an outlet; and
the porous honeycomb body of claim 22 disposed between the inlet and the outlet.

24. The filter of claim 23, further comprising at least one catalyst deposited on the plurality of fibers of the walls.

25. A method of forming a porous honeycomb substrate, method comprising:
mixing a plurality of fibers, fluid, and two or more reactive constituents to form an extrudable mixture;
extruding the extrudable mixture into a honeycomb substrate;
heating the honeycomb substrate to remove the fluid; and
reacting the two or more reactive constituents to form a bonding material between a portion of at least two fibers within the plurality of fibers, the bonding material having a lower coefficient of thermal expansion than the plurality of fibers.

* * * * *